United States Patent [19]

Maeda

[11] Patent Number: 5,103,360
[45] Date of Patent: Apr. 7, 1992

[54] MAGNETIC RECORDING AND/OR REPRODUCING APPARATUS IN WHICH A HEAD AND A RECORDING MEDIUM ARE DETACHED FROM EACH OTHER PURSUANT TO THE POSITION OF THE HEAD CONFRONTING THE MEDIUM

[75] Inventor: Masaya Maeda, Kanagawa, Japan

[73] Assignee: Canon Kabushiki Kaisha, Tokyo, Japan

[21] Appl. No.: 590,340

[22] Filed: Sep. 28, 1990

Related U.S. Application Data

[63] Continuation of Ser. No. 501,364, Mar. 29, 1990, abandoned, which is a continuation of Ser. No. 339,860, Apr. 14, 1989, abandoned, which is a continuation of Ser. No. 165,445, Mar. 1, 1988, abandoned, which is a continuation of Ser. No. 65,147, Jun. 12, 1987, abandoned, which is a continuation of Ser. No. 631,614, Jul. 14, 1984, abandoned.

[30] Foreign Application Priority Data

Jul. 25, 1983 [JP] Japan ................. 58-134279

[51] Int. Cl.$^5$ .................................. G11B 5/54
[52] U.S. Cl. ................................... 360/105
[58] Field of Search .............. 360/97.01, 99.01, 99.08, 360/105, 109, 99.03–99.04

[56] References Cited

U.S. PATENT DOCUMENTS

| | | | |
|---|---|---|---|
| 3,953,891 | 4/1976 | Wilmoth | 360/105 |
| 4,218,714 | 8/1980 | Isozaki et al. | 360/99 |
| 4,241,366 | 12/1980 | Nishida et al. | 360/105 |
| 4,302,789 | 11/1981 | Vos | 360/105 |
| 4,484,241 | 11/1984 | Brende et al. | 560/105 |
| 4,504,879 | 3/1985 | Toldi | 360/97 X |

FOREIGN PATENT DOCUMENTS

| | | |
|---|---|---|
| 55174763 | of 0000 | Japan . |
| 49-117008 | 11/1974 | Japan . |
| 51-7072 | 2/1976 | Japan . |
| 55-135371 | 10/1980 | Japan . |

*Primary Examiner*—John H. Wolff
*Attorney, Agent, or Firm*—Toren, McGeady & Associates

[57] ABSTRACT

A recording and/or reproducing apparatus including a magnetic transducing head arranged in transducing relationship with the recording surface of a magnetic disc, a moving device for moving the head along the recording surface of the disc, and a detaching mechanism for detaching the head and the recording surface of the disc from each other at a predetermined position of the head on the recording surface of the disc.

8 Claims, 2 Drawing Sheets

MAGNETIC RECORDING AND/OR REPRODUCING APPARATUS IN WHICH A HEAD AND A RECORDING MEDIUM ARE DETACHED FROM EACH OTHER PURSUANT TO THE POSITION OF THE HEAD CONFRONTING THE MEDIUM

This is a continuation application of Ser. No. 07/501,364, filed Mar. 29, 1990, abandoned, which in turn is a continuation application of Ser. No. 339,860, filed Apr. 14, 1989, abaoned, which in turn is a continuation application of Ser. No. 07/165,445 filed Mar. 1, 1988, abandoned, which in turn is a continuation application of Ser. No. 07/065,147, filed June 12, 1987, abandoned, which in turn is a continuation application of Ser. No. 06/631,614 filed July 17, 1984, abandoned.

BACKGROUND OF THE INVENTION

1. Field of the Invention

The present invention relates to a recording and/or reproducing apparatus, and more particularly to a recording and/or reproducing apparatus arranged to use a flexible record bearing medium.

2. Description of the Prior Art

Examples of the relevant prior art include a floppy disc apparatus or a still video recording and/or reproducing wherein a flexible magnetic disc is used and wherein it is proposed to use such a disc as a record bearing medium.

When this kind of recording and/or reproducing apparatus is kept in a non-operative state for a long time with the magnetic disc being kept loaded in the apparatus, the magnetic head is kept in contact with the magnetic disc, so that the part of the magnetic disc with which the magnetic head is in contact is deformed permanently due to the projecting effect of the magnetic head. As a result, it sometimes occurs that magnetic head adheres to the magnetic disc. Thus, when the magnetic disc is rotated, the magnetic material on the recording surface of the magnetic disc is stripped off so that at the time of recording the part which has been stripped off is not available for recording a signal so that at the time of playback, no signal is reproduced from that part of the disc where the magnetic material has been stripped off.

For avoiding the above-mentioned occurrence, the head may be positioned out of the predetermined recording range, whereby when no recording and reproducing are to be carried out for a long time with the magnetic disc loaded in the reproducing apparatus is kept in non-operative state.

However, when the magnetic disc is compact, mere positioning of the magnetic head out of the predetermined recording range will cause a danger that the recording range can be deformed permanently by the abutment at the part with which the magnetic head is in contact.

Needless to say such an inconvenience is not limited to apparatuses in which a flexible magnetic disc is used, but it will also occur in recording and/or reproducing apparatus in which a flexible recording medium such as a flexible magnetic drum is used.

SUMMARY OF THE INVENTION

It is, accordingly, an object of the present invention to provide a novel recording and/or a reproducing apparatus free from the above inconvenience.

It is another object of the present invention to provide a recording and/or reproducing apparatus for flexible recording medium designed so that even when the apparatus is kept in a non-operative state with the recording medium loaded in the apparatus, there is no danger that the recording medium will be permanently deformed or damaged by the head.

For attaining these objects, in a preferred embodiment of the invention, a recording and/or reproducing apparatus comprises transducing head means arranged in transducing relation with the recording surface of a record bearing medium, moving means for moving the head means along the recording surface of the medium, and detaching means for relatively detaching the head means and the recording surface of the medium from each other according to the position of the head means.

It is further another object of the present invention to provide a recording and/or a reproducing apparatus which eliminates the above-mentioned inconvenience by comparatively simple means.

For this object, according to the embodiment of the invention, the detaching means includes a cam member arranged to detach the head means from the recording surface of the medium when the head means is moved to a predetermined position which is out of a predetermined recording area on the recording surface of the medium.

Further objects and features of the present invention will be apparent from the following detailed description of the preferred embodiments set forth hereinbelow with reference to the accompanying drawings.

The description will be limited by of the present invention applied to a recording and/or reproducing apparatus in which a flexible magnetic disc housed in a cassette is used. However, it should be understood that the present invention is not limited to such embodiments. For example, the recording medium may be a flexible magnetic sheet wound on a reel cylindrically or in the shape of drum. Thus, the present invention can be widely applied to recording and/or a reproducing apparatus in which a flexible recording medium is used.

BRIEF DESCRIPTION OF THE DRAWINGS

Below, the present invention will be described with reference to the accompanying drawings of the preferred embodiment thereof.

DETAILED DESCRIPTION OF THE PREFERRED EMBODIMENTS

Figure 1:
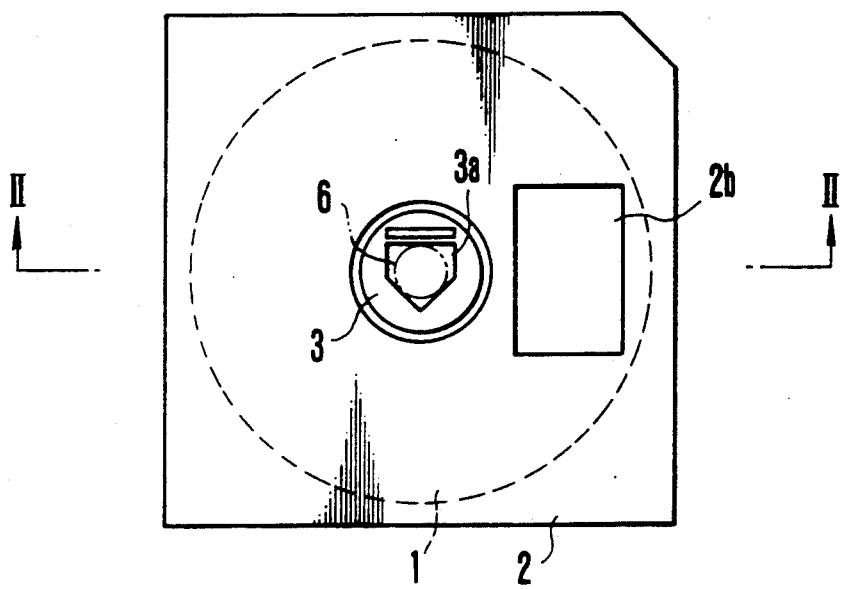
FIG. 1 is a plan view showing a cassette in which the flexible magnetic disc to be used in an embodiment of the present invention.

In FIG. 1, 1 is a flexible magnetic disc comprising a recording medium, housed in the cassette 2. At the center of the magnetic disc 1, a center hub 3 formed of plastics and having a pentagonal hole 3*a* in which there is secured a spindle of a disc rotary motor to be described hereinafter. 2b is an opening provided on the upper surface of a cassette 2 in which opening a stabilizing plate (not shown) is inserted.

Figure 2:
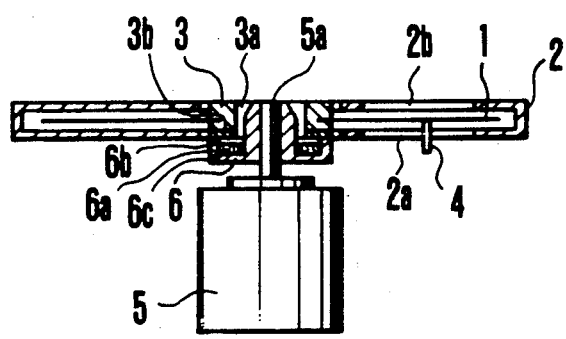
FIG. 2 is a sectional view of FIG. 1 along II—II showing the disc in the cassette mounted on the spindle of the disc rotating motor.

As is shown in FIG. 2, on the lower surface of the cassette 2, there is provided an opening 2a in which the magnetic head 4 is inserted whereby the magnetic head 4 is in contact with the magnetic disc 1 via the opening 2a with the cassette 2 loaded in the apparatus as is shown in the draw.ing.

Further, at this time the spindle 6 which is provided at the end of the output shaft 5a of the disc rotary motor 5 so as to rotate the shaft 5a, is pushed into the hole 3a provided in the center hub 3. On the lower surface of the center hub 3 a magnetic plate (iron plate) 3b is secured, while at a flange part 6a of the spindle 6 a magnet 6c is secured in such a manner that the magnetic plate 3b on the lower surface of the center hub 3 is attracted toward the flange part 6a by the magnet 6c, and the height is determined by an end surface 6b of the flange 6a.

Figure 3:
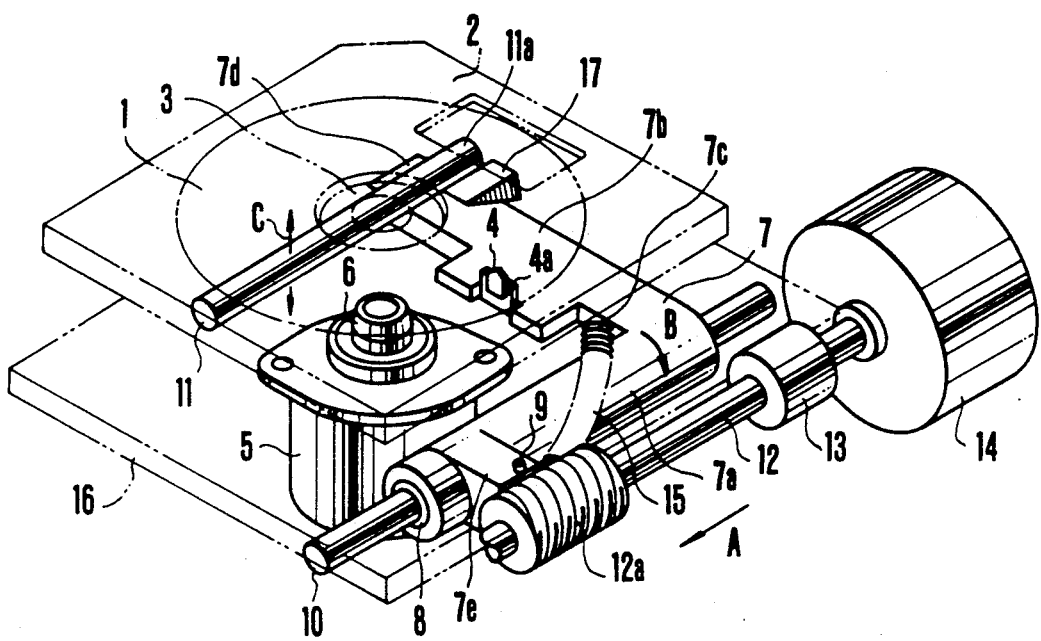
FIG. 3 is a perspective view showing important parts of an embodiment of the present invention.

FIG. 3 shows the cassette 2, in which the magnetic disc 1 is loaded, and the important parts of the recording and/or the reproducing apparatus. Here, for the sake of ease of comprehension, the cassette 2 and the important part of the apparatus are shown in the state in which the cassette 2 is not pushed in the spindle 6 of the disc motor 5.

The disc motor 5 is secured on a main body chassis 16 and rotates the magnetic disc 1 housed in the cassette 2 at a certain determined speed via the spindle 6. 14 is a head feeding step motor secured on the main body chassis 16 so as to impart a stepping rotation to a driving shaft 12 having a screw 12a via a flexible joint 13. 7 is an L-shaped head carrier carrying the magnetic head 4, consisting of a cylindrical part 7a and a plate shaped arm part 7b. The head 4 is secured at the center of tne arm part 7b via a head base 4a. At both ends of the cylindrical part 7a, sintered bearings 8 are pushed in so as to be opposed to each other. Through the sinperdd bearings 8 a first guide shaft or rod 10 is inserted with a clearance of several μm between the circumference of the guide shaft 10 and the internal surface of the bearings 8. Both of the first guide shaft 10 are secured on the main body chassis 16 by support means (not shown).

9 is an engaging pin which is secured at an engaging pin mounting part 7e of the cylindrical part 7a of the head carrier 7 in such a manner that it is inclined at a certain determined angle with reference to the axis of the first guide shaft 10 so as to correspond to the lead angle of the screw 12a.

15 is a helical spring, having one end engaged with a part 7c of the head carrier 7 and another end is engaged with a spring holder (not shown) on the main body chassis 16, whereby the spring 15 is wound around the cylindrical part 7a of the head carrier 7. This spring 15 urges the head carrier 7 in the direction of the arrow A. along the first shaft 10, imparting thereto a rotation moment in the direction the arrow B around the first guide shaft 10, i.e., in the clockwise direction. By the rotation moment in the clockwise direction given by the spring 15, the end 7d of the arm part 7b of the head carrier 7 is brought into contact with a second guide shaft or rod 11 from below. The second guide shaft 11 is arranged parallel to the first guide shaft 10 and held by the main body chassis 16. By the urging force in the direction of the arrow A and the rotation moment in the direction of the arrow B (clockwise direction) given to the head carrier 7 by the spring 15, the backlash between the engaging pin 9 and the screw 12a and the idleness between the bearing 8 of the cylindrical part 7 and the first guide shaft 10, caused by the backlash, can be eliminted. Here, it is possible to adjust the projecting amount of the magnetic head 4 by adjusting the height of the second guide shaft 11 by adjusting means (not shown) as is shown by the arroc C in the drawing and rotating the arm part 7b around the first guide shaft 10 in the clockwise direction or counterclockwise direction.

In accordance with the stepping rotation of the screw 12a corresponding to the stepping rotation of the step motor 14, the head carrier 7 moves stepwise along the guide shaft 10 via the engaging pin 9 engaged with the screw 12a. Thus, the head 4 moves stepwise in the radial driection along the recording surface of the disc 1 so that the position for recording or reproducing on the recording surface on the disc 1 changes.

Here, in accordance with the forward rotation of the step motor 14, the head carrier 7 moves in the direction of the arrow A so that the head 4 is moved toward the center of the disc 1, while in accordance with the backward rotation the head carrier 7 moves in the direction opposite to the arrow A so that the head 4 is moved toward the circumference of the disc 1.

17 is a cam member acting as detaching means for detaching the head 4 from the recording surface of the disc 1, having a cam surface inclined downwards so that when the arm part 7b of the head carrier 7 engages with the cam member 17, the carrier 7 is rotated around the guide shaft 10 in the direction opposite to the arrow B against the urging force given by the spring 15 in the direction of the arrow B so as to detach the head 4 from the recording surface of the disc 1. The cam member 17 is arranged so as to detach the head 4 from the disc 1 when the head 4 is moved up to a predetermined position out of a predetermined recording area on the disc 1, and is secured, for example, on a raised part of the main body chassis 16 or on a part of the cassette support member 18 for determining the loading position of the cassette 2 as is shown in FIG. 4.

Figure 4:
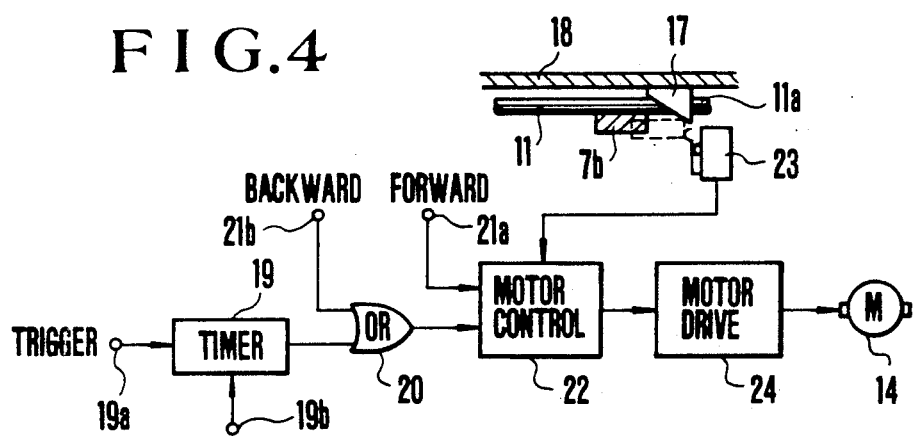
FIG. 4 is a schematic view which shows the head detaching mechanism for the apparatus shown in FIG. 3 and the control circuit for the head moving motor.

In FIG. 4, 19 is a timer circuit for counting a predetermined time in response to a trigger signal supplied an input terminal 19a and producing a high level signal after the lapse of the predetermined time. The output is supplied to a control circuit 22 for the step motor via an OR gate 20.

The timer circuit 19 is reset when a reset signal is supplied to an input terminal 19b. Here, the trigger is supplied to the input terminal 19a when the operation of the apparatus is stopped (initiating the non-operative state), while the reset signal is supplied to the input terminal 19b when the operation of the apparatus is started (initiating the operative state). To terminals 21a and 21b a head forward move instruction and a head backward move instruction for changing the recording position or the reproducing position are respectively supp The head forward move instruction from the input terminal 21a is directly supplied to the step motor control circuit 22, while the head backward move instruction is supplied to the circuit via the OR gate 20. The control circuit 22 controls the step motor 14 via a step motor driving circuit 24 in such a manner that the step motor 14 rotates forward so as to move the head 4 forward in response to the instruction from the input terminal 21a, while the step motor 14 rotates backward so as to move the head 4 backward in response to the instruction from the OR gate 20. 23 is a detecting means such as a micro-switch for detecting whether the head 4 is detached from the disc 1 by the cam member 17 and is so designed as to be closed by the arm part 7b when the head carrier 7 is rotated by the cam member 17 in the direction opposite to the arrow B in FIG. 3. The detecting means 23 is connected to the motor control circuit 22. The motor control circuit 22 stops.the motor. 14 in response to the signal (ON signal) from the detecting means 23.

In the case of the above-mentioned construction, when the apparatus is in operation, the magnetic head 4 arranged on the head carrier 7 is in contact with the magnetic disc 1 which is continuously rotated by the disc motor 5. When, in this state, the step motor 14 rotates stepwise, the screw 12a is driven in a stepping rotation, whereby the head carrier 7 moves stepwise along the guide shaft 10 via the engaging pin 9 in engagement with the screw 12a. Thus, the magnetic head 4 provided at the arm part 7b of the head carrier 7 moves intermittently in the radial direction of the magnetic disc 1 so as to change the recording or the reproducing position.

Hereinbelow, there will be set forth a description in connection with the case where the apparatus is not operated longer than a predetermined time in the state in which the cassette 2 remains loaded in the apparatus. When, as is shown in FIG. 4, the trigger signal is supplied to the input terminal 19a while the apparatus stands still, the timer circuit 19 starts to operate and produces the head backward move instruction after the lapse of a predetermined time. This head backward move instruction is supplied to the step motor control circuit 22 via the OR gate 20, which circuit 22 controls the step motor driving circuit 24 in rsponse to the head backward move instruction so as to rotate the step motor 14 backward. Thus, the head carrier 7 is moved stepwise in the direction opposite to the arrow A in FIG. 3, whereby the head 4 is moved toward the outermost circumference of the magnetic disc 1. At the time point at which the head 4 reaches a predtermiend position at the outside of a predetermined recording area of the disc 1 during the course of the backward movement thereof, the arm part 7b of the head carrier 7 engages with the cam member 17 so that the head carrier 7 is rotated against the spring 15 around the guide shaft 10 in the direction opposite to the arrow B in FIG. 3. Thus, the head 4 is detached from th recording surface of the disc 1. In the state in which the head 4 is detached, the arm part 7b of the head carrier 7 is in the position shown in a broken line 7'b in FIG. 4 so that the detecting means 23 is cloe,d whereby the control circuit 22 stops the step motor 14 so as to stop the head 4.

In a case where the apparatus is operated again before the above-mentioned predetermined time has elapsed, namely before the timer circuit 19 produces the head backward move instruction, after the apparatus is once brought in the non-operative state, the reset signa is supplied to the timer circuit 19 via the input teminal 19b so as to reset the timer circuit 19 so that the head backward move instruction is not produced.

Figure 5:
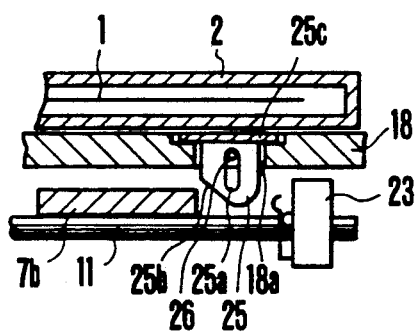
FIG. 5 is a sectional view of the important part of another embodiment of the present invention shown in a similar way as in FIG. 4.

Here, as a modification of the embodiment explained above, for example, the cam member 17 can be secured at the lower part near the end 11a of the second guide shaft 11 in FIGS. 3 and 4 or the part near the end 11a of the second guide shaft 11 can be constructed as an inclined cam surface. Further, in a case where the spring 15 is mounted so as to urge the head carrier 7 in the direction opposite to the arrow A in FIG. 3 and give it the rotation moment in the direction opposite to the arrow B, while the end 7d of the arm part 7b of the head carrier 7 is in contact with the second guide shaft 11 from the above, the same effect as above can be obtained by forming the guide surface near the end 11a of the second guide shaft 11 as a cam surface inclined downward. Further, in the case as is shown in FIG. 5, at a part of a cassette support member 18, a hole 18a is provided and a cassette push up member 25 is put in it so as to be movable upward and downward by the engagement of a slot 25a with a guide pin 26. Therefore, when the head 4 is moved up to the above predetermined position, the arm part 7b of the head carrier 7 strikes against the taper surface of the push up member 25 so as to push up the push up member 25, whereby the cassette 2 is pushed up by the cassette push up part 25c of the push up member 25. Thus, the recording surface of the disc 1 housed in the cassette 2 is detached from the head 4.

Of course, such a detaching of the head 4 from the disc 1 may be carried out at a predetermined position out of a predetermined recording area in the inner side of the disc 1, the variation for which is easy.

Further, in a case where the present invention is applied for the recording and/or the reproducing apparatus in which a non-flexible or hand record bearing medium is used, the fear of danger by the contact of the medium with the head an be eliminated, which advantageously facilitates the exchange operation.

While specific embodiments of the invention have been shown and described in detail to illustrate the application of the inventive principles, it will be understood that the invention may be embodied otherwise without departing from such principles.

What I claim:

1. A recording and/or reproducing apparatus using a disc type medium; comprising:
   (a) a transducing head;
   (b) means for moving said head on said medium'
   (c) means for detecting that a prescribed time has passed while said head has been held unmoved by said moving means and for outputting a characteristic signal which represents that said prescribed time has been passed;
   (d) changing means for changing a relative position between said transducing head and said medium to a predetermined position for detaching said head from said medium; and
   (e) means for operating said changing means in response to said characteristic signal.

2. The apparatus according to claim 1, further comprising a carriage member for carrying said transducing head.

3. The apparatus according to claim 1, wherein said change means is means for detaching said transducing head from said medium.

4. The apparatus according to claim 3, wherein said moving means includes:
   a guide rod penetrating through a portion of said carriage member for linearly guiding the carriage member along the recording surface of the medium;
   and wherein said detaching means being arranged to rotate said carriage member about said guide rod to detach said transducing head from the recording surface of the medium.

5. The apparatus according to claim 4, wherein said operating means rotates said carriage member about said guide rod to detach said transducing head from the recording surface of the medium.

6. A control apparatus for controlling a transducing head and moving means for moving said transducing head vis-a-vis a recording disc, comprising:
(a) means for detecting that a prescribed time has passed while said head has been held unmoved by said moving means and for outputting a characteristic signal which represents that said prescribed time has been passed;
(b) changing means for changing a relative position between said transducing head and said medium to a predetermined position for detaching said head form said medium; and
(c) means for operating said changing means in response to said characteristic signal.

7. The apparatus according to claim 6, wherein said changing means are means for detaching said transducing head from said medium.

8. The apparatus according to claim 6, wherein said moving means includes a guide rod penetrating through a portion of a carriage member for linearly guiding the carriage member along the recording surface of the medium, and detaching means arranged to rotate the carraige member about said guide rod to detach said transducing head from the recording surface of the medium.

* * * * *

UNITED STATES PATENT AND TRADEMARK OFFICE
CERTIFICATE OF CORRECTION

PATENT NO. : 5,103,360

DATED : 7 April 1992

INVENTOR(S) : Masaya Maeda

It is certified that error appears in the above-identified patent and that said Letters Patent is hereby corrected as shown below:

On the Title page, item
(63) Should read as follows:

Continuation of Ser. No. 501,364, Mar. 29, 1990, abandoned, which is a continuation of Ser. No. 339,860, Apr. 14, 1989, abandoned, which is a continuation of Ser. No. 165,445, Mar. 1, 1988, abandoned, which is a continuation of Ser. No. 65,147, Jun. 12, 1987, abandoned, which is a continuation of Ser. No. 631,614 Jul. 17, 1984, abandoned Signed and Sealed this Seventeenth Day of August, 1993

Attest:

BRUCE LEHMAN

*Attesting Officer*  *Commissioner of Patents and Trademarks*